United States Patent [19]

Coucoulas et al.

[11] 4,372,771
[45] Feb. 8, 1983

[54] METHODS AND APPARATUS FOR EXTRUDING ARTICLES

[75] Inventors: Alexander Coucoulas, Bridgewater Township, Somerset County; John R. Nis, Hamilton Township, Mercer County, both of N.J.

[73] Assignee: Western Electric Company, Inc., New York, N.Y.

[21] Appl. No.: 250,466

[22] Filed: Apr. 2, 1981

[51] Int. Cl.³ .................... C03B 5/16; C03B 37/025
[52] U.S. Cl. ........................................... 65/75; 65/83; 65/86; 65/134; 65/187; 65/326; 65/329
[58] Field of Search ............... 65/68, 75, 83, 86, 130, 65/134, 2, 13, 187, 326, 329, 347

[56] References Cited

U.S. PATENT DOCUMENTS

| | | | |
|---|---|---|---|
| 946,179 | 1/1910 | Weiskopf | 65/13 |
| 2,495,956 | 1/1950 | Cook | 65/13 X |
| 3,460,930 | 8/1969 | Pityo | 65/155 |
| 3,645,712 | 2/1972 | Ihrig et al. | 65/347 X |
| 4,032,313 | 6/1977 | Tokuhara | 65/1 |
| 4,046,535 | 9/1977 | Stalego | 65/2 |
| 4,078,909 | 3/1978 | Dietzsch et al. | 65/2 |
| 4,195,982 | 4/1980 | Coucoulas et al. | 65/134 |

Primary Examiner—Richard V. Fisher
Attorney, Agent, or Firm—D. J. Kirk

[57] ABSTRACT

A fused silica glass tube (26) is extruded from a melt (21) in a chamber (11) pressurized with an inert gas. A shield is placed in close, spaced, relation to the melt (21) surface during the gas pressure extrusion process to substantially eliminate losses from the melt due to vaporization.

6 Claims, 4 Drawing Figures

METHODS AND APPARATUS FOR EXTRUDING ARTICLES

TECHNICAL FIELD

The instant invention relates to methods and apparatus for extruding articles. In particular, the invention is directed to a gas head extrusion technique for forming articles from a viscous glass melt.

BACKGROUND OF THE INVENTION

U.S. Pat. No. 4,195,982 assigned to Western Electric Company, Inc. discloses apparatus for extruding a tube of hollow glass from a melt using a gas pressure head. Heat is applied to a cylindrical chamber having an inert atmosphere therein and containing glass to form a viscous melt. The pressure of the inert atmosphere within the chamber is increased to cause the viscous melt to flow through an annular opening in the bottom of the chamber to form a hollow glass tube.

The above-described technique has been found to be effective for extruding hollow glass tubes. However, it was found that there was a loss of the melt material (e.g., $SiO_2$) via vaporization due to the non-equilibrium conditions that exist in the chamber during the extrusion process. A portion of the vaporized melt material deposits in the inside upper (cooler region) portion of the chamber. Such deposition of the material and attendant loss from the melt can be considerable when extruding glass over extended periods of time. Additionally, such deposits may pick up contaminants from the chamber wall or the gaseous environment therein and ultimately fall back into the melt during the extrusion process resulting in a poor quality glass tube.

Accordingly, there is a need for a technique to eliminate or substantially inhibit the formation of deposits of vaporized melt material during the gas pressure head glass extrusion process.

SUMMARY OF THE INVENTION

The foregoing problem has been overcome by the instant method of extruding glass tubing by applying a gas pressure head, within a chamber containing the melt, to urge portions of the melt through an annular orifice in the chamber to form the glass tubing; while simultaneously preventing any substantial vaporization losses of the melt.

Apparatus used to implement the instant method of extruding tubing from a glass melt, comprises a chamber having a gas inlet and an annular opening in the bottom portion thereof; and at least one planar shield mounted within the chamber, proximate a melt zone to substantially prevent evaporative losses of the melt during the extrusion of the tube.

DETAILED DESCRIPTION

Figure 1:
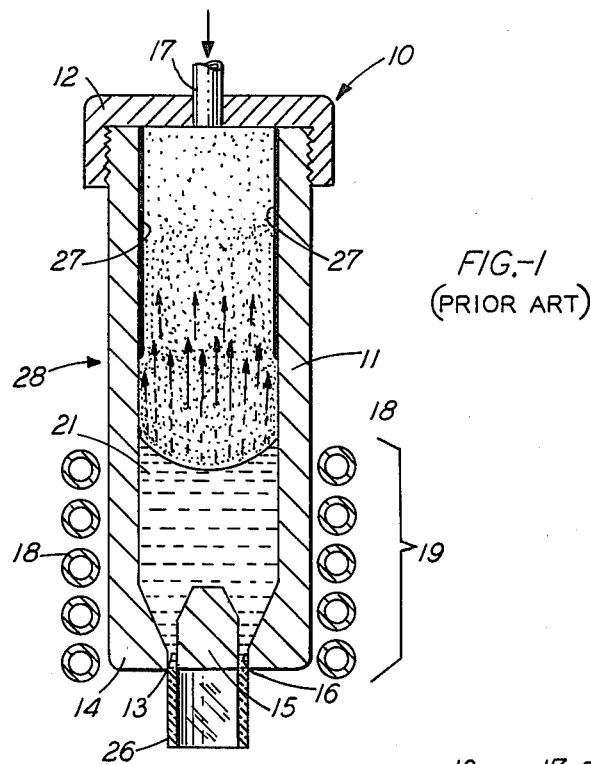
FIG. 1 is a cross-sectional view of a conventional gas head glass extrusion apparatus.

FIG. 1 of the drawings is a cross-sectional view of a gas head extrusion apparatus, generally designated by the numeral 10. The apparatus 10 is fabricated from TZM material which is a molybdenum alloy containing approximately 0.5% titanium, 0.1% zirconium, 0.02% carbon and the balance molybdenum. The apparatus 10 is comprised of a cylindrically shaped chamber 11 with a cap 12 on the top portion and an annular opening 13 in the base 14 thereof. The annular opening 13 may be formed by inserting a mandrel 15 in an aperture 16 in the base 14 as is fully described in the aforementioned U.S. Pat. No. 4,195,982 which is incorporated by reference herein. The cap 12 has a tube 17 extending therethrough and an electrical coil 18 surrounds the lower portion of the chamber 11.

In operation, the cap 12 is removed and a solid billet of glass (e.g., fused silica) or particulate glass is placed in the lower portion of the chamber 11 and the cap placed back on the chamber. The coil 18 is electrically energized to inductively heat the lower portion of the chamber 11 to form a heat zone 19. The billet or particulate of fused silica glass is raised to a temperature of about 2,000° C. to cause the glass to soften into a molten mass 21 having a viscosity of about $10^5$ poise. The glass flows to effectively seal the narrow annular opening 13 as a gas (e.g., argon, helium, or the like) is directed into the chamber 11 via the tube 17 to bring the pressure therein to about 100 psi. The gas pressure causes the molten glass 21 to be extruded through the annular opening 13 to form a hollow glass tube 26.

The above technique has proven effective for extruding glass tubes 26, however, it has been found that a substantial amount of silica is evaporated from the melt 21. The chamber 11 is under non-isothermal conditions and contains the foreign gaseous specie which provides the gas pressure head above the melt 21. The total equilibrium vapor pressure of a silica melt at 1,777° C. is approximately $10^{-4}$ atmosphere and approximately $10^{-3}$ atmosphere at 2,070° C. which is composed of partial pressure, at 2,070° C., of the following gaseous elements and molecules: SiO (approximately $10^{-3}$ atmosphere); $O_2$ (approximately $8 \times 10^{-4}$ atmosphere); O (approximately $10^{-4}$ atmosphere); $SiO_2$ (approximately $6 \times 10^{-5}$ atmosphere); $Si_2O_2$ (approximately $10^{-9}$ atmosphere).

With the foreign gaseous pressure head employed above the melt, a loss of $SiO_2$ via vaporization occurs due to the apparent non-equilibrium conditions existing in the chamber 11 during the extrusion of the glass tube 26. A fine powder 27 has been found to deposit on the inside surface of the cooler upper region 28 of the chamber 11. The arrows give a general indication of the direction of the flow of the vaporized material. The powder was identified by a scanning electron microscope analysis as largely containing Si. Such deposits of powder 27 can result in considerable loss of the $SiO_2$ when extruding glass tubes 26 over extended periods of time. Additionally, the powder 27 may pick up contaminants from the chamber wall as well as the gaseous environment and ultimately fall back into the melt 21 resulting in the extrusion of a poor quality tube 26.

Figure 2:
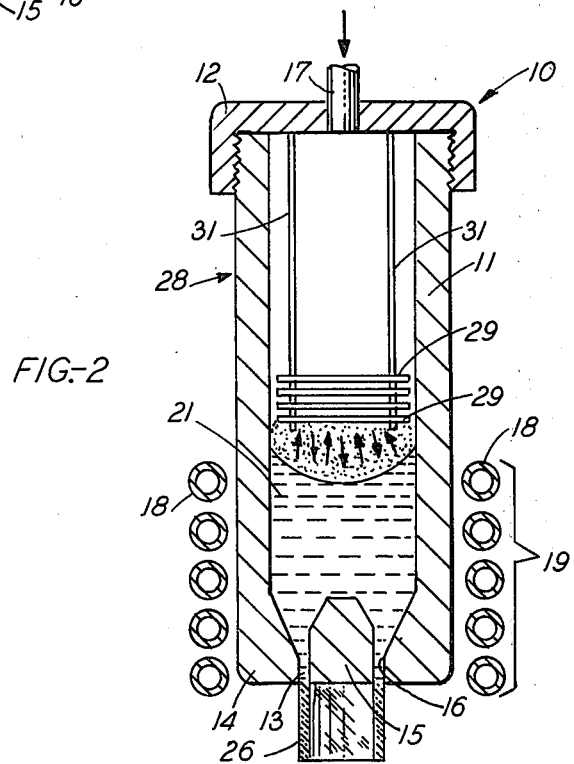
FIGS. 2 and 3 are cross-sectional views of a gas head extrusion apparatus having shields mounted therein.

It has been discovered that the placing of at least one planar shield 29, (see FIG. 2) in close, spaced relation to the surface of the melt 21 and the inside surface of the wall of chamber 11, will substantially eliminate the formation of the deposited powder 27 on the inside wall of the chamber 11 under substantially the same temperature, pressure and gaseous environmental conditions described above. FIG. 2 depicts the chamber 11 with a plurality of parallel, spaced, shields 29—29, held by hanger 31, with the lowest shield spaced from the melt 21. Although, the instant invention can be implemented using a single shield 29, the use of multiple spaced shields provides an insulating layer between the shields which also helps in preventing heat loss to the cooler upper portion 28 of the chamber 11. In a particular embodiment the shields 29—29 are circular molybdenum discs between 5 and 10 mils thick with their outer periphery close to and spaced from the inner surface of the wall of the chamber 11 by about one-eighth of an inch with the lowest shield in closed spaced relation to the melt 21. The shields 29—29 are supported by rods 31—31 (e.g., Tungsten) depending from the cap 12.

Although the mechanism is not fully understood it appears that the shield 29 contains substantially all of the vapor of the melt 21 so that near equilibrium conditions are maintained as generally indicated by the arrows. In other words, equilibrium between $SiO_2$ (liquid) and the vapor pressure of this liquid which is known to be composed of $SiO;O_2;O;SiO_2$ and $Si_2O_2$. The total vapor pressure of $SiO_2$ at 2,000° C. being approximately $10^{-3}$ atmosphere. Furthermore, due to the high temperature of the shield 29 only minimal amounts of the vaporized melt will deposit thereon.

Figure 3:
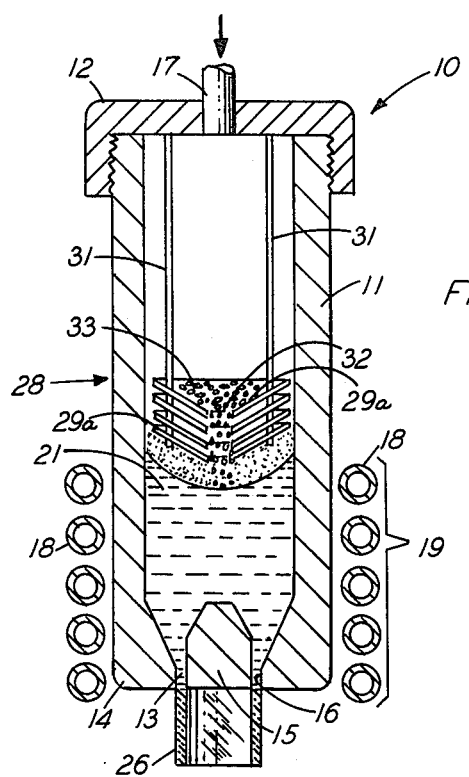

FIG. 3 depicts an embodiment in which each of the shields 29a—29a slope downwardly from their periphery toward a central opening 32 therein. Such frustoconically shaped shields 29—29 permit particulate glass 33 to be fed into the molten glass melt 21 through the vertically aligned apertures 32—32. The particulate glass 33 may either be an initial charge placed in the upper section 28 on top of the upper shield 29 and continuously fed until the charge is depleted or particulate may be continuously fed into the upper portion of the chamber 11 through a pressurized inlet (not shown).

Figure 4:
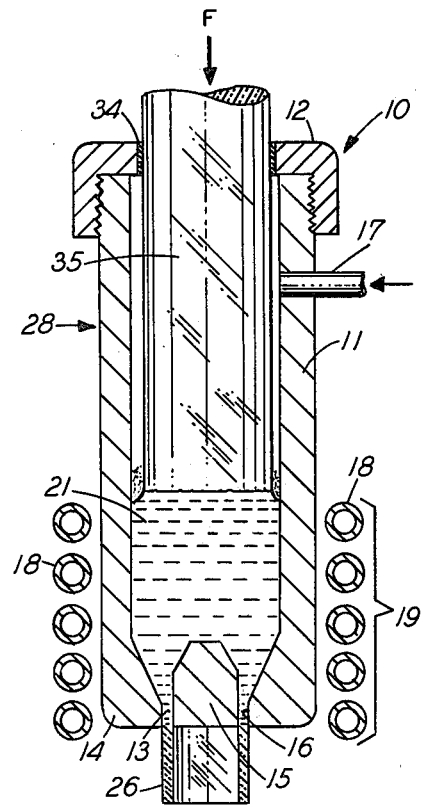
FIG. 4 is a cross-sectional view of a gas head glass extrusion apparatus in which a solid rod of glass is continuously fed into a melt zone.

FIG. 4 shows a further embodiment of the instant invention wherein a solid glass billet 35 is continuously fed into the hot zone 19 to supplement the melt 21. The cross sectional area of the billet 35 is slightly less than the cross-sectional area of the inner diameter of the chamber 11 to permit the gas pressure head to act on the melt 21 while minimizing the total surface area from which the melt material can evaporate. In addition, it has been found that by continuously feeding such a billet 35 into the melt 21 the amount of bubbles formed therein are substantially reduced. In a particular embodiment a solid fused silica billet 35 having a diameter of about 1.3 inches was inserted in the chamber 11 having an inner diameter of approximately 1.4 inches via a pressure seal 34 in the cap 12.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of extruding tubing from a glass melt, which comprises the steps of:
    applying a gas pressure head, within a chamber containing the melt, to urge portions of said melt through an annular orifice in said chamber to form the glass tubing; while
    simultaneously shielding the surface of the melt with a shield that is located in close, spaced relation to the melt and the inside surface of the chamber wall to prevent any substantial evaporative loss from the melt.

2. An apparatus for extruding a tube from a glass melt, comprising:
    a chamber having a gas inlet and an annular opening in the bottom portion thereof; and
    a frusto conically shaped shield, having an opening in the central portion thereof, mounted within the chamber, proximate the melt, to substantially prevent evaporative losses of the melt during the extrusion of the tube.

3. An apparatus for extruding a tube from a glass melt, comprising:
    a chamber having a gas inlet and an annular opening in the bottom portion thereof; and
    a plurality of frusto conically shaped, vertically aligned heat shields, each having an opening in the central portion thereof, mounted within the chamber, in spaced relation to each other and to the melt zone.

4. An apparatus for extruding tubing from a glass melt, comprising:
    means for applying a gas pressure head, within a chamber containing the melt to urge portions of said melt through an annular orifice to form the glass tubing; and
    means for simultaneously shielding the surface of the melt with a shield that is located in close, spaced relation to the melt and the inside surface of the chamber wall to prevent any substantial loss from the melt during the extrusion of the tube.

5. An apparatus for extruding a tube from a glass melt, comprising:
    a chamber having a gas inlet and an annular opening in the bottom portion thereof; and
    at least one planar shield located in close, spaced relation to the melt and the inside surface of the chamber wall to substantially prevent evaporative losses of the melt during the extrusion of the tube.

6. The apparatus as set forth in claim 5, wherein:
    a plurality of planar heat shields are vertically aligned and in spaced relation to each other and to the melt zone.

* * * * *